No. 700,764. Patented May 27, 1902.
H. E. HARDY.
COVER FOR COOKING UTENSILS.
(Application filed July 1, 1901.)

(No Model.)

Witnesses:
George Oltsch
Hugo Oltsch

Hattie E. Hardy
Inventor
By Lehmann & Dalton
Attys.

THE NORRIS PETERS CO., PHOTO-LITHO., WASHINGTON, D. C.

UNITED STATES PATENT OFFICE.

HATTIE E. HARDY, OF WALKERTON, INDIANA.

COVER FOR COOKING UTENSILS.

SPECIFICATION forming part of Letters Patent No. 700,764, dated May 27, 1902.

Application filed July 1, 1901. Serial No. 66,719. (No model.)

*To all whom it may concern:*

Be it known that I, HATTIE E. HARDY, a citizen of the United States, residing at Walkerton, in the county of St. Joseph and State of Indiana, have invented certain new and useful Improvements in Covers for Cooking Utensils; and I do hereby declare the following to be a full, clear, and exact description of the invention, such as will enable others skilled in the art to which it appertains to make and use the same.

My invention relates to covers for cooking utensils; and its object is to provide the cover with means for holding the bail of the vessel elevated from the sides of the same to prevent it from becoming heated and in a position convenient to be grasped by the hand, which means also serves to clamp the cover tightly upon the top of the pot or pan to prevent the escape of steam from the top edges thereof.

With these objects in view the invention consists in the novel construction, combination, and arrangement of parts, as will be more fully described hereinafter and finally pointed out in the appended claims.

Figure 1:
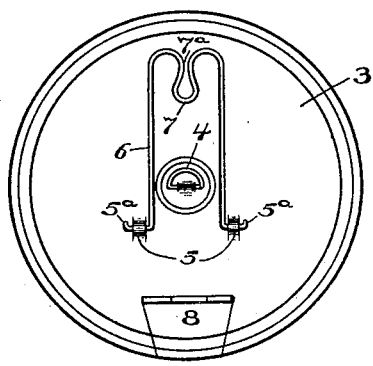
Figure 2:
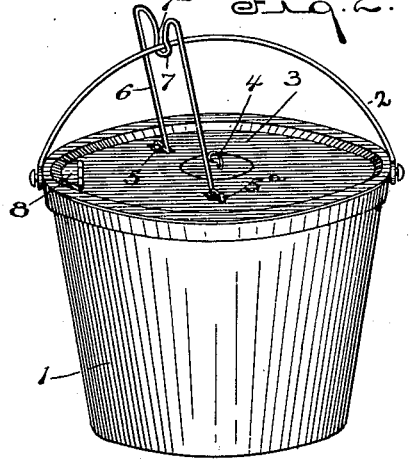
Figure 3:
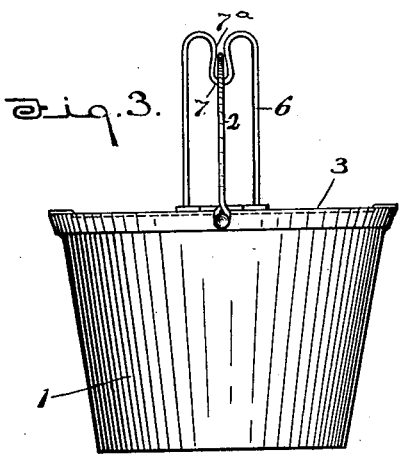
Figure 4:
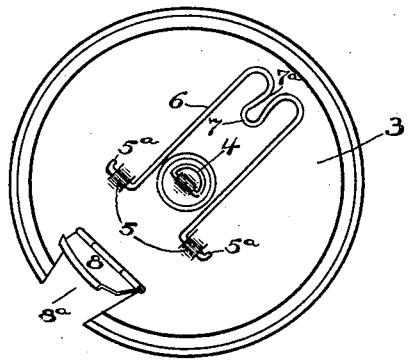

Referring to the accompanying drawings, Figure 1 is a top plan view of the lid or cover. Fig. 2 is a perspective view of a pot with my invention applied thereto. Fig. 3 is a side elevation of a pot, showing the manner of engaging the bail with the bail-holder. Fig. 4 is a perspective view of the cover, showing the auxiliary hinged cover open.

Like numerals of reference indicate corresponding parts throughout the several views.

1 designates a cooking utensil, which in this instance is an ordinary pot provided with the usual bail 2, by which the pot is handled.

3 indicates my improved cover, which is dished to provide a marginal offset edge to engage the upper edge of the top of the pot, as shown, and is provided with a suitable hinged handle 4 in the center thereof. Attached to the top of the lid are the ears 5, in which are journaled the ends of a U-shaped spring-wire 6, which forms a holder for the bail. The ends of the bail-holder are bent outwardly at right angles to form a journal for the ears 5, the extreme ends being bent backwardly, as at 5$^a$, to prevent the bail-holder from being dislodged. The wire from which the bail-holder is made is formed with an inwardly-turned loop 7 in the middle of the horizontal portion of the holder, the inturned loop being wider at its base than at the entrance of the same, as shown at 7$^a$, so that when a bail is engaged by the loop it is first forced beyond the narrow neck 7$^a$ and into the wider or base portion of the loop, by which construction it cannot be released accidentally, as it forms a constrictive engagement about the bail. The bail-holder being hinged to the top of the lid at a point slightly beyond the center of the latter will allow the holder to lie flat upon the top and its end will not project beyond the edge of the cover. Likewise when the holder is lifted to the position shown in Figs. 2 and 3 the bail will be engaged by the holder at the point or neck 7$^a$ in the recess when the holder is exactly perpendicular; but as it is thrown farther back, as shown in Fig. 2, the bail will be forced within the larger portion of the recess and the bail will be retained in a position convenient to be grasped and will be prevented from becoming heated, as they do when allowed to lie beside the pot. It will also be seen that by pivoting the holder slightly beyond the center of the lid it will operate as efficiently upon a pot in which the arc formed by the bail is greater or smaller than the one shown in the drawings, for the reason that the holder swings in a plane at right angles to the movement of the bail and engages the bail near one end or at a point between its center and the end, whereas if it were hinged exactly in the middle of the cover and the bail of the pot were very large the holder may not engage the same, since the arc described by the holder would not be as great as that of the bail.

The cover is further provided with an auxiliary hinged cover 8, which closes the opening 8$^a$ cut in the edge of the cover. When the pot is tilted to pour off the contents, the auxiliary hinged lid or cover 8 will open and will close when the pot again assumes its proper position upon the stove.

Having thus described my invention, what I claim, and desire to secure by Letters Patent, is—

1. The combination with a cooking vessel and its bail, of a cover for the vessel provided with a bail-holder adapted to swing in a plane at right angles to the movement of the bail, said holder having a spring-lip to engage the bail and form a constrictive engagement about the same.

2. In a device of the class described, a cover for cooking vessels provided with a bail-holder hinged to the cover at a point off of the center of the same, said holder formed from spring-wire bent into substantially U-shaped form, and provided with an inwardly-depending spring-loop adapted to engage the bail, said loop having a narrow neck, through which the bail is sprung.

3. In a device of the class described, a cover for cooking vessels provided with a bail-holder hinged to the cover at a point off the center of the same, and adapted to swing in a plane at right angles to the bail of the vessel, said bail-holder having a resilient recess formed therein which engages the bail to form a constrictive engagement about the same.

In testimony whereof I affix my signature in presence of two witnesses.

HATTIE E. HARDY.

Witnesses:
W. F. LA FEBRE,
T. C. WENGER.